UNITED STATES PATENT OFFICE.

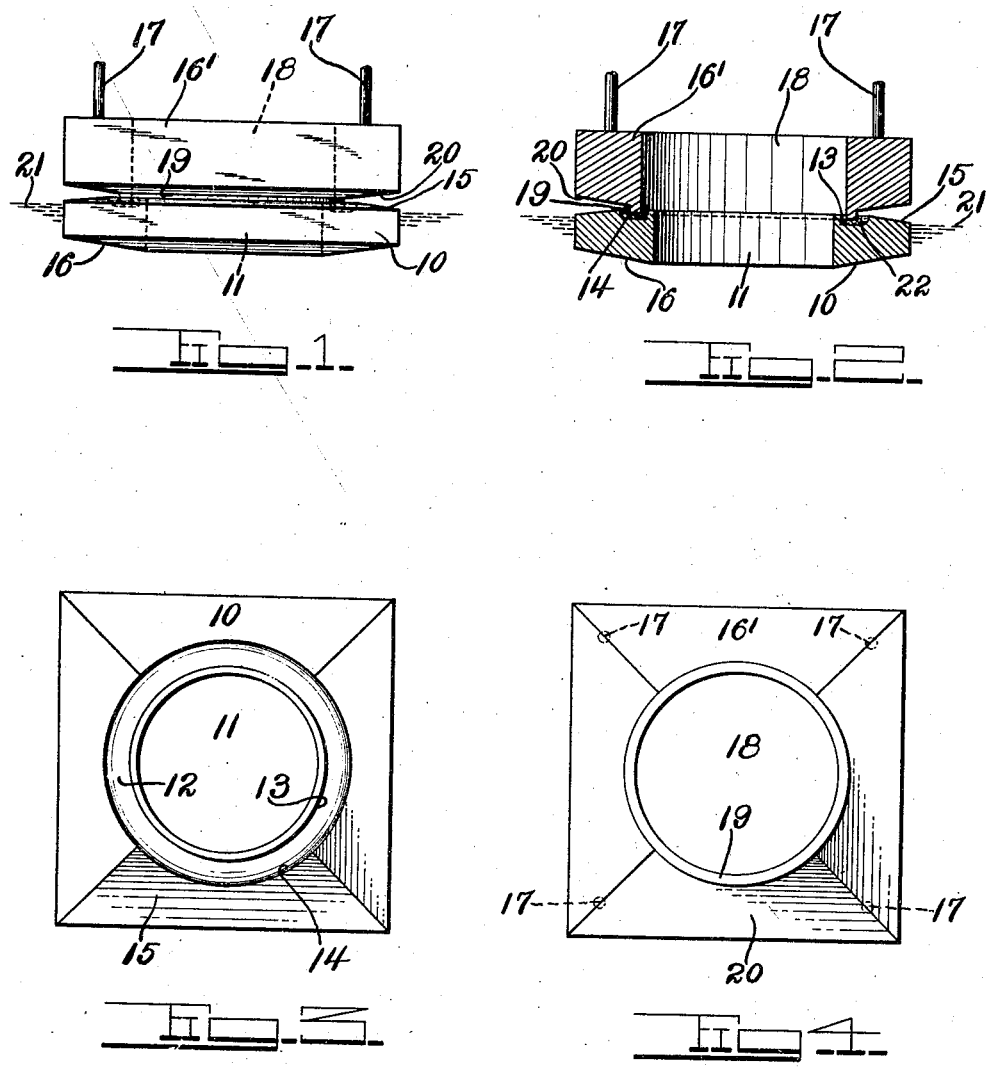

JAMES H. ALLAN, OF MORGANTOWN, WEST VIRGINIA, ASSIGNOR, BY MESNE ASSIGNMENTS, TO UNITED STATES WINDOW GLASS COMPANY, OF MORGANTOWN, WEST VIRGINIA, A CORPORATION OF WEST VIRGINIA.

GLASS-DRAWING APPARATUS.

1,342,080.     Specification of Letters Patent.     Patented June 1, 1920.

Application filed December 21, 1915, Serial No. 68,005. Renewed November 6, 1919. Serial No. 336,233.

*To all whom it may concern:*

Be it known that I, JAMES H. ALLAN, a citizen of the United States, residing at Morgantown, in the county of Monongalia and State of West Virginia, have invented new and useful Improvements in Glass-Drawing Apparatus, of which the following is a specification.

This invention is an improvement in glass drawing apparatus of the type employed for the manufacture of window glass and the like.

Heretofore, in drawing glass cylinders, it has been common practice to employ a floating drawing ring, usually of clay, having a central opening exposing the molten glass from which the cylinder is drawn. In conjunction with the floating ring, it is customary to employ a removable top stone, to protect the cylinder from the intense heat at the drawing point. Experience has proven, however, that the top stone and the drawing ring do not maintain a sufficiently close contact to prevent the flames from sweeping in between them, causing more or less damage to the cylinder being drawn. The object of the present invention is to overcome the foregoing objection, by providing a combined drawing ring and top stone having means for positively preventing access of the flames to the cylinder during the drawing operation.

The invention will be hereinafter fully set forth and particularly pointed out in the claims.

In the accompanying drawings:—

Figure 1 is a side elevation illustrating the combined drawing ring and top stone. Fig. 2 is a vertical sectional view thereof. Fig. 3 is a top plan view of the drawing ring. Fig. 4 is a bottom plan view of the top stone.

Referring to the drawing, 10 designates the buoyant drawing ring, constructed of refractory clay, or any other material suitable for the purpose, said ring being of substantially rectangular shape in plan, although any other desired shape may be employed. Said ring is provided with a central opening 11, preferably circular, and the top surface thereof is provided with an annular groove 12, spaced a relatively short distance from the opening 11. The inner wall 13 of the groove 12 is approximately parallel with the wall of the opening 11, and the outer wall 14 is slightly curved, as shown. The top surface of the ring 10 is beveled from the outer wall of the groove 12, to the outer edge, as indicated at 15, and the bottom surface is correspondingly beveled at 16, from the opening 11 to the outer edges.

The top stone 16, is of the same shape as the floating ring, and provided with the usual lifting rods 17, whereby it may be raised and lowered, in a manner well known in the art. Said top stone is provided with a central opening 18, somewhat larger in diameter than the opening 11, and the lower face of said top stone is provided with an annular rib 19, surrounding the opening 18, and the under surface of the top stone is beveled from said rib to the edges as indicated at 20.

In practice the ring member floats upon the surface of the molten glass, the level of which is indicated at 21, and molten glass is also caused to enter the groove 12, as indicated at 22. When the cylinder is to be drawn, the top stone 16 is lowered so that the rib 19, enters the groove 12, in such manner that the molten glass 22 forms a seal between the ring and the top stone, thereby providing an absolute barrier which will prevent flames sweeping over the surface of the molten glass, from contacting with the cylinder being drawn. In this way a more perfect cylinder is obtained than is possible under the old practice, for the reason that portions of the cylinder are not softened during the drawing operation, and hence the body of the cylinder is uniform throughout its length. As the top stone is lowered into engagement with the ring member, the rib 19, in its engagement with the groove 12, prevents lateral displacement of the ring member with respect to the top stone. The opposed faces of the top stone and the ring member are beveled sufficiently to permit the flames to pass to the glass in groove 12, thereby maintaining said glass in a molten condition, and also permitting of the scouring of the parts of glass particles that may temporarily cool thereupon.

Having thus explained the nature of my invention and described an operative manner of constructing and using the same, although without attempting to set forth all of the forms in which it may be made, or all of the forms of its use, what I claim is:—

1. An improvement in glass drawing apparatus comprising a ring member and a superposed top stone member contacting therewith, the opposed faces of said members having a complemental groove and rib connection providing a flame barrier between the members above the normal level of the molten glass, said opposed faces having spaced apart portions surrounding the groove and rib connection and adjacent thereto to permit the heating of the groove and rib connection.

2. An improvement in glass drawing apparatus comprising a ring member, a superposed top stone, and means for providing a glass seal between said ring and said top stone and separated from the bath of molten glass, the opposed faces of the ring and the top stone being shaped to permit heat to reach the glass seal, whereby the latter is maintained in a molten condition.

3. An improvement in glass drawing apparatus comprising a ring member having a central opening, and an annular groove in its upper face surrounding said opening, the top surface of said ring member being beveled, and a top stone having a central opening and an annular rib on its bottom surface surrounding said opening, and located to engage said groove, the under surface of said top stone being beveled.

4. An improvement in glass drawing apparatus comprising a buoyant ring member having a central opening, a superposed top stone also having a central opening, the opposed faces of the top stone and the ring having complemental interfitting portions forming a seal to prevent flames from passing between them to said openings, said opposed faces having beveled portions to permit heating of the interfitting portions.

5. An improvement in glass drawing apparatus comprising a buoyant ring member, and a top stone above the ring member and contacting therewith, the superposed contacting faces of the top stone and the ring member being provided with annular interengaging portions capable of retaining a glass seal separated from the bath of molten glass, said contiguous faces being flared from the interengaging portions to the peripheries to permit the access of sufficient heat to the glass seal to maintain the glass in a molten condition.

In testimony whereof I have hereunto set my hand in presence of two subscribing witnesses.

JAMES H. ALLAN.

Witnesses:
J. W. MARSHALL,
CHAS. PALMER.